Dec. 22, 1970   J. A. JENSEN   3,548,533
DISINSECTION SYSTEM AND CARTRIDGE FOR USE THEREWITH
Filed May 23, 1969   2 Sheets-Sheet 1
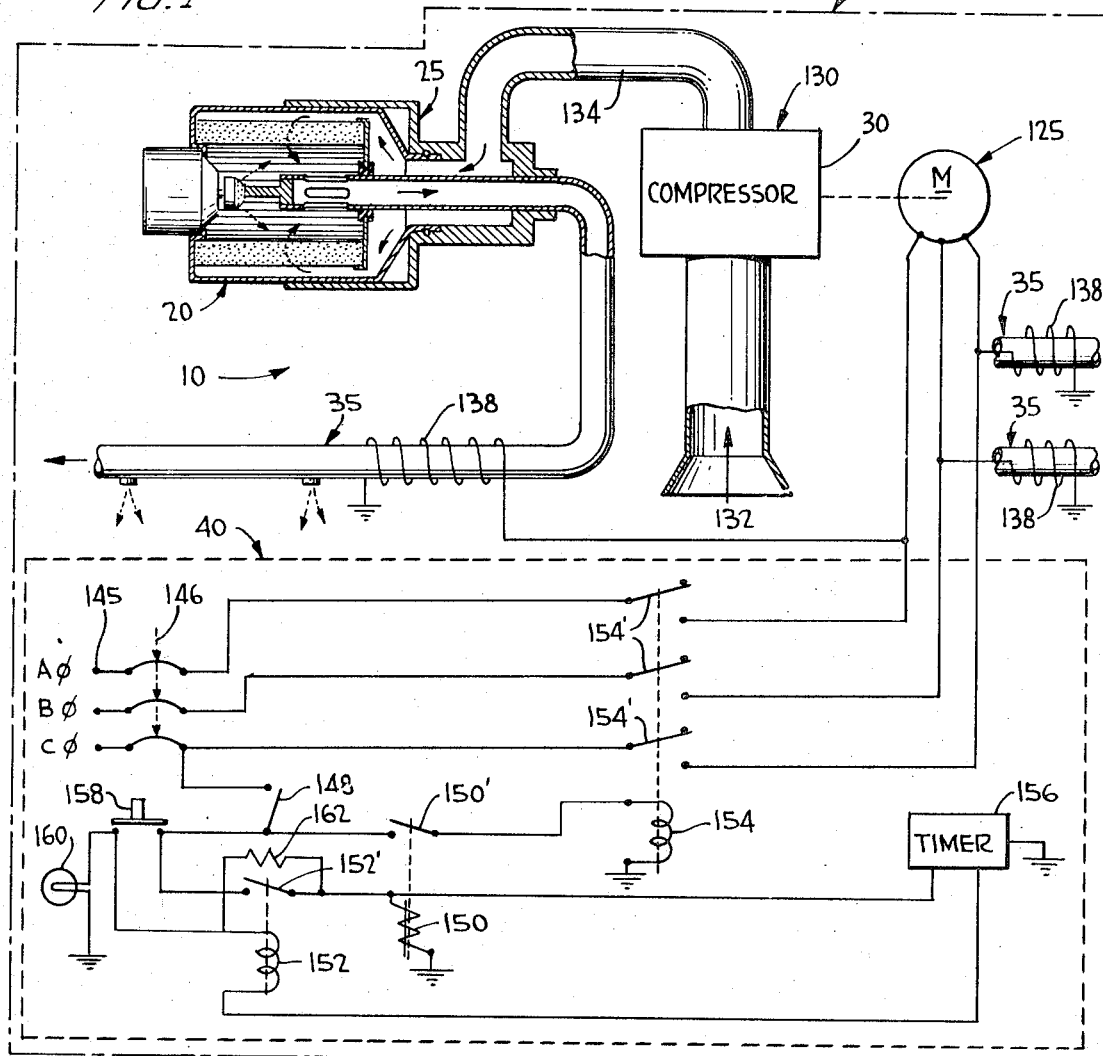
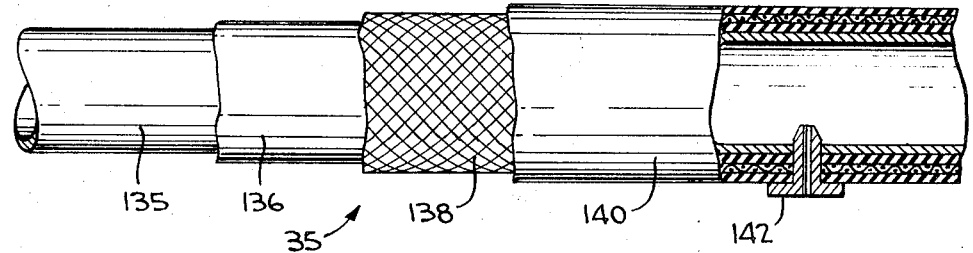
INVENTOR,
JENS A. JENSEN
BY Holman & Stern
ATTORNEYS Dec. 22, 1970    J. A. JENSEN    3,548,533
DISINSECTION SYSTEM AND CARTRIDGE FOR USE THEREWITH
Filed May 23, 1969    2 Sheets-Sheet 2
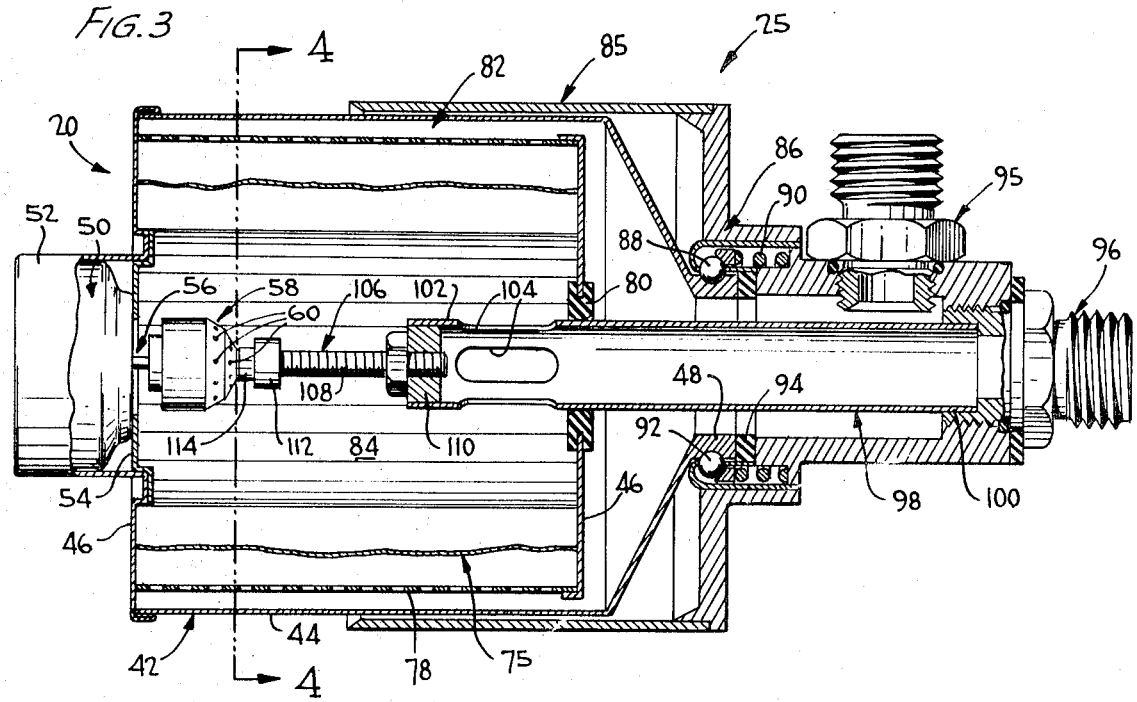
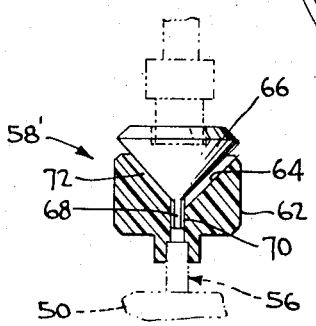
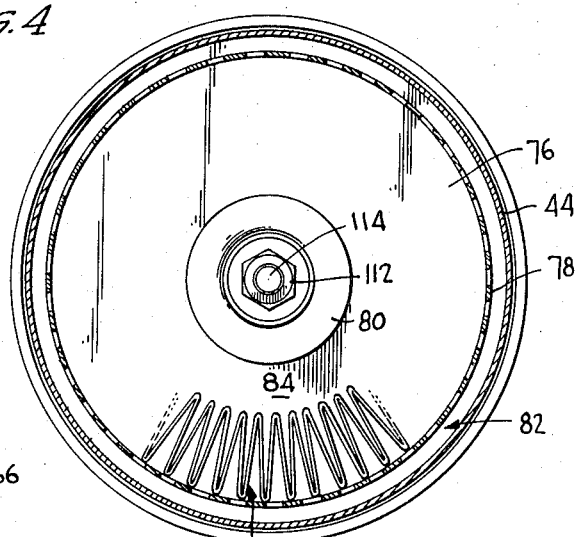
INVENTOR,
JENS A. JENSEN
BY Holman & Stern
ATTORNEYS

United States Patent Office 3,548,533
Patented Dec. 22, 1970

3,548,533
DISINSECTION SYSTEM AND CARTRIDGE FOR USE THEREWITH
Jens A. Jensen, Savannah, Ga., assignor to the United States of America as represented by the Secretary of the Department of Health, Education, and Welfare
Filed May 23, 1969, Ser. No. 827,352
Int. Cl. A01m 13/00
U.S. Cl. 43—129                    11 Claims

ABSTRACT OF THE DISCLOSURE

A disinsection system, particularly for use in pressurized aircraft, comprising a "one shot" cartridge containing a predetermined quantity of a mixture of a propellent and an active material, preferably, dichlorvos, a manifold and support assembly for receiving the cartridge and automatically spraying the active material onto an absorbent filter means within the cartridge, a motor-compressor unit for feeding pressurized carrier air into the cartridge, through the filter means to pick up a quantity of the active material and to heated distribution conduit means for carrying the air-active material mixture to locations remote from the cartridge. A control unit is provided for delaying activation of the compressor means and conduit heater means for a time sufficient to insure complete absorption of the active material by the filter means and a timer unit which automatically deactivates the system when disinsection has been completed.

---

This application relates to disinsection systems and cartridges therefor and relates more particularly to a disinsection system for use in aircraft.

The disinsection of aircraft is quite important as a preventative measure against transporting disease vectors from one country to another. Actually, the problem of destroying insects in aircraft is relatively simple in the abstract, but from a practical standpoint difficulties are encountered since it is necessary to utilize a system which causes a minimum of interference to traffic operation and a minimum of discomfort to the passengers and crew. Treatment with aerosols based primarily on pyrethrum and DDT, sometimes supplemented with residual deposits of DDT, had been the accepted practice for many years even though it became increasingly evident that aerosol treatments were far from adequate in many respects. Some of the major weaknesses of the aerosol method are the difficulty of insuring that treatment has been carried out effectively, the discomfort caused to passengers, and the questionable effectiveness of the aerosols against insects under the conditions encountered in practice. This latter inadequacy is probably the most important. Tests have shown that in loaded baggage compartments complete kills of free-flying houseflies were not obtained with a dosage of aerosol as high as 600 g. per 1000 cubic feet, the recommended dosage of 5 g. per 1000 cubic feet in passenger compartments being shown consistently to give poor kills of the free-flying houseflies exposed to the treatment in aircraft in flight.

Additionally, the development of resistance to certain aerosols such as DDT provides another inadequacy to such systems. More recently a new volatile organic phosphorous compound commonly called dichlorvos (2,2-dichlorovinyl dimethyl phosphate, also called DDVP) has provided a material which is entomologically effective without passengers in an aircraft being aware of its presence. However, in order for such material to be useful it is necessary to provide a suitable distribution system.

Prior art techniques of aircraft disinsection utilizing aerosols involved spraying the cabin and baggage compartments with such material. It was found that the best time for effective application of such aerosols in the passenger cabin was after the embarkation of passengers and the closing of doors, but before take-off. The pilots' cabin was disinsected prior to their entry and cargo and baggage compartments were treated just before take-off. This technique was called "blocks away" and can be effective if carefully applied, presuming that the insects had not developed resistance to the insecticide used. However, the difficulties in careful application of such a system are believed obvious in that the insecticide in aerosol state is particulate and must be directed into cabin baggage racks, clothes hanging areas, toilets, etc. for complete use. Further, the "blocks away" method is considered impractical for disinsection of large super-jet aircraft.

The effectiveness of an insecticidal vapor treatment is a function of the concentration of the toxicant and the duration of exposure of the insects. Toxic concentrations of an insecticide are difficult to maintain in an aircraft where the cabin air is renewed continuously, oftentimes once every two to three minutes. Under these conditions any momentary treatments such as the use of pressurized aerosols is inadequate. Further, even with the use of a vapor disinsectant such as dichlorvos, uniform distribution of the vapor throughout the space to be disinsected to maintain a toxic concentration for sufficient period to insure complete kill of disease vectors is necessary.

Various prior art references disclose cartridges in which an insecticide or the like is sprayed onto an absorbent matrix, but such devices are designed to operate spontaneously and the rate of vaporization is variable being governed by the humidity, the tempearture and natural convection. Dichlorvos is readily hydrolyzed by moisture and forms a nonvolatile compound (dimethyl phosphoric acid) which covers the vaporizing surface and acts as a barrier to the vaporization and diffusion processes. Thus, a marked decline in output occurs over a short period of time and spontaneous systems of the prior art type are unable to deliver biologically effective vapor concentrations.

Dichlorvos or other such volatile insecticides cannot be properly dispensed unless a cartridge containing the same is utilized in combination with a disinsection system capable for carrying controlled volumes of air at controlled and predetermined temperatures through a matrix of which the dichlorvos is absorbed. The factors which control the rate of vaporization are (1) the volume of air passing through the matrix to carry the vapor away and furnishing the heat of vaporization of the volatile insecticide, (2) the temperature of the carrier air, (3) the amount of liquid insecticide on the matrix, and (4) the surface area of the matrix from which the vapors emanate. A suitable disinsection system must properly control all of the foregoing factors and, when used in aircraft, must provide preselected values to produce a predetermined vapor concentration which can be maintained in the space to be disinsected even though the space may be ventilated continuously as experienced in aircraft. In order for a disinsection system to be adequate for the purposes intended it must be capable of maintaining a biologically effective concentration of the insecticide for one half hour or longer.

Thus, it is a primary object of the instant invention to provide a disinsection system and a cartridge for use therewith which functions to control all of the variables ordinarily encountered to produce the necessary vapor concentration over an extended period. Further, this invention provides a cartridge which, when used with the disinsection system hereof, is effective to produce vapor at a rate as much as 40 mg. per minute, this rate being unobtainable with spontaneous vaporizers of the prior art type which are incapable of delivering the large quantities of vapor needed for maintenance of a biologically effective concentration for aircraft or other such disinsection purposes since such prior art devices result in a build up of decomposition products from hydrolysis which slows the vaporization rate to unacceptable levels.

It is a further object of this invention to provide a cartridge for use in a disinsection system which is a "one shot" unit designed to operate at a high rate of output for approximately thirty minutes. Distribution of insecticide vapor spontaneously would take substantially longer periods of time, the time period utilized with the disinsection system of the instant invention being sufficiently limited to prevent any appreciable hydrolysis that would affect the rate of output.

It is yet another object of this invention to provide a cartridge and disinsection system wherein it is impossible to lose control of the active material by spills, wherein it is impossible to produce the contact with the skin of the operator of the system by the insecticide or accidental breathing of concentrated vapor because the insecticide material is always trapped either in a miniature pressure vessel or in a filter matrix and the vapors are removed from the cartridge only by forcing carrier air through the matrix.

A further object of the instant invention is the provision of a disinsection system which is "fail safe" and operated at its maximum capacity, the capacity being readily adjustable to meet the requirements of a certain type and size of aircraft or other space to be disinsected. With the system of the instant invention any malfunction or failure results in a lower output of vapor or a complete cessation of output. Since all insecticides, including dichlorvos, are toxic to humans to some extent, it is mandatory that the system is fully controllable to kill the insects without adversely affecting the passengers or crew in an aircraft, this absolute control of the vaporization of the insecticide being the crux of the system of the instant invention and the cartridge utilized therewith.

A still further object of the instant invention is the provision of a disinsection system which requires relative small amounts of active materials, it simple and inexpensive to manufacture and maintain, highly durable in construction and reliable in use.

Another important object of this invention is the provision of a disinsection system which is substantially automatic in use requiring little training of operators to insure proper control, the operator merely attaching a cartridge containing the active material to the system and pressing a button, the system including means to delay passage of carrier air through the cartridge for a time sufficient to insure complete dispening of the active material onto the filter matrix and further including means to automatically deactivate the operating mechanism after a period sufficient to insure that the active material has been completely distributed throughout the space to be disinsected.

Other and further objects reside in the combination of elements, arrangement of parts and features of construction. Still other objects will in part be obvious and in part be pointed out as the description of the invention proceeds and as shown in the accompanying drawings wherein:

FIG. 1 is a schematic illustration of the overall disinsection system of the instant invention;

FIG. 2 is an enlarged fragmentary view of a portion of the distribution conduit means utilized in this system, partly in cross-section for illustrative clarity;

FIG. 3 is an enlarged cross-sectional view of the cartridge, manifold and support assembly utilized in the disinsection system of the instant invention;

FIG. 4 is a transverse cross-sectional view taken substantially on lines 4—4 of FIG. 3; and FIG. 5 is an enlarged cross-sectional view through another form of nozzle means which can be utilized with the cartridge of this invention.

Like reference characters refer to like parts throughout the several views of the drawings.

Referring now to the drawings, and more particularly to FIG. 1, a disinsection system in accordance with the instant inventive concepts is schematically shown and designated generally by the reference numeral 10, an aircraft or other means defining the space to be disinsected being schematically illustrated by the dot-dash lines designated by the reference numeral 15. The system 10 comprises basically five major components, a "single use" insecticide cartridge designated generally by the reference numeral 20, a manifold and support assembly therefor designated generally by the reference numeral 25, a motor-compressor unit designated generally by the reference numeral 30, vapor distribution conduit means designated generally by the reference numeral 35 and an electrical control unit schematically illustrated within the dotted lines 40.

Further details of the cartridge 20 and the manifold and support assembly 25 are shown in FIG. 3 and 4. The cartridge 20 comprises basically a housing means 42 including an imperforate peripheral side wall 44, a closed base portion 46 and an oppositely disposed, tapered open neck portion 48. A pressurized vessel in the form of a miniature aerosol container 50 is seated within an offset flange 52 of the base portion 46 of the housing means 42 and retained therein by plate 54. A suitable quantity of a mixture of a propellent such as Freon 12 (dichlorodifluoromethane) and an active material such as dichlorvos is contained within the vessel 50, the active material being dispensed from the vessel 50 under the pressure of the propellant on actuation of a normally closed valve means 56 operatively associated with the vessel. The valve means 56 may take any conventional form and is actuated by pressure thereagainst to open the same in a manner to be described in more detail hereinafter.

A nozzle means 58 is operatively associated with the valve means for spraying the dispensed active material toward the peripheral side wall 44 of the housing means 42. The nozzle means 58 may merely be in the form of a chamber having a plurality of apertures 60 therein such as shown in FIG. 3 or, alternatively, may take the form shown in FIG. 5 at 58' which includes a base element 62 having a conical depression 64 with a conical dispersing element 66 positioned in spaced relationship thereto by a grooved stem 68 press fit into a bore 70 within the base element 62 to provide a peripheral spray channel 72 between the elements 62 and 66. The nozzle means 58' forms no part of the instant invention and is only illustrated as a suitable and sometimes preferred, substitute for the nozzle means 58.

A filter means, preferably in the form of a pleated paper filter member 75 is interposed between the nozzle means 58 and the peripheral side wall 44 of the housing means 42 for absorbing the active material sprayed from the nozzle means 58. Other suitable filter means may be substituted for the pleated paper member illustrated in the drawings and it is to be understood that the filter means can adsorb as well as absorbed the active material sprayed from the nozzle means 58. In the illustrated embodiment the pleated paper filter member 75 extends between, and may be adhesively attached to, the base portion 46 of the housing means 42 and an end plate 76 carried by a foraminous shell 78 in the form of a wire mesh or perforated metal element.

An elastromeric gasket means 80 is carried by the end plate 76 for a purpose to be described in more detail hereinafter.

It will be seen that a first chamber 82 is defined between the outer surface of the filter means 75 and the inner surface of the peripheral side wall 44 of the housing means 42 and a second chamber 84 is defined interiorly of the filter means 75. Thus, after absorption of the active material by the filter means 75, a pressurized carrier gas can be fed into the cartridge 20 to one of the chamber means in a manner to be described in more detail hereinafter, through the filter means 75 to the other of the chamber means and out of the cartridge 20 to thereby pick up a quantity of the active material from the filter means 75 and deliver the same to a location remote from the cartridge 20 under controlled conditions.

The manifold and support assembly 25 includes support means for removably receiving and holding the cartridge 20 in the form of a support sleeve 85 which surroundingly engages at least a portion of the peripheral side wall 44 of the housing means 42 of the cartridge 20 and a quick-disconnect coupling means 86 removably engaging the neck portion 48 of the housing means 42. The quick-disconnect coupling means 86, in the embodiment shown, includes a plurality of ball bearings 88 normally urged by spring means 90 into locking engagement with a peripheral groove 92 defined about the neck portion 48 of the housing means 42. An elastomeric gasket means 94 is carried by the manifold and support assembly 25 to sealingly engage the end of the neck portion 48 of the housing means 42 when the cartridge 20 is received by the manifold and support assembly 25.

The manifold portion of the manifold and support assembly 25 includes an inlet 95 communicating the first chamber 82 with a source of a carrier gas under pressure to be described in more detail hereinafter, and further includes an outlet 96 communicating the second chamber means 84 with the conduit means 35. An elongated hollow element 98 is secured at one end 100 in communication with the outlet 96 and has its opposite end portion 102 extending into the second chamber means 84 when the cartridge 20 is received and held by the manifold and support assembly 25. The end portion 102 includes a plurality of spaced apertures 104 communicating the interior of the hollow element 98 with the second chamber means 84. As will be seen particularly from FIG. 3 the gasket means 80 carried by the cartridge 20 sealingly engages about the exterior of the hollow element 98 in sapced relationship to the end portion 102 to segregate the first and second chamber means 82, 84 respectively.

A trigger means 106 is carried by the end portion 102 of the hollow element 98 and includes a stud 108 threadably received in a guide nut 110 on the end portion 102 of the hollow element 98, with the opposite end of the stud 108 carrying a cup 112 in which is press fit a resilient button 114 adapted to pressingly engage the nozzle means 58 and thus the valve means 56 upon insertion of the cartridge 20 into the manifold and support assembly 25 thereby automatically opening the valve means 56 and spraying the active material from the nozzle means 58 onto the filter means 75.

Referring again to FIG. 1 the motor-compressor unit 30 preferably comprises an electrically driven integral unit which, when the disinsection system is utilized in an aircraft, is operated by available aircraft power to produce the required amount of compressed carrier air. Basically, this unit includes an electrically operated motor means 125 which drives air compressor means 130 in any conventional manner, a source of air for the compressor 130 being shown at 132 and a duct 134 for communicating the outlet of the compressor means 130 with the inlet 95 of the manifold and support assembly 25 to feed compressed carrier air to the first chamber 82 within the cartridge 20 and through the filter means 75 to the second chamber 84 from which it passes through the apertures 104 in the elongated element 98 to the outlet 96 of the manifold and support assembly 25 and thence to the conduit means 35 for distribution throughout the aircraft.

An enlarged portion of the conduit means 35 is shown in FIG. 2 and preferably comprises a thin walled stainless steel tubing 135 coated with a layer of insulation 136, a conducting material such as electrical resistance wires 138 and an outer coating of insulation 140. Distribution nozzles 142 are press fit into the conduit means 35 at desired locations.

The duct 134 from the compressor 130 may be heated in a manner similar to that described for the conduit means 35 if desired or necessary to properly control the temperature of the air being fed to the cartridge 20.

The control means 40 preferably comprises a three phase source of electrical power 145, an appropriate circuit breaker 146, an "override" switch 148, a thermal delay relay 150, a locking relay 152, a power switching relay 154, an electrical timer, self-setting and equipped with a circuit breaking switch schematically, shown at 156, a momentary push button switch 158 and an indicator light 160. Additionally, a digital elapsed time indicator (not shown) may be included in the circuitry if desired to maintain a record of the total time of operation of the disinsection system.

The disinsection system of the instant invention operates as follows. The operator, for example a flight attendant in an aircraft, closes the "override" or "on-off" switch 148, inserts a cartridge 20 in the manifold and support assembly 25 and then presses the momentary push button switch 158 to activate the system. This completes the manual operation and the system then proceeds automatically in the following manner. As soon as the cartridge 20 is inserted into the manifold and support assembly 25 it is interlocked securely with the quick-disconnect coupling means 86 and the trigger means 106 presses against the nozzle means 58 which in turn presses the valve means 56 to open the same and spray the active material onto the filter means 75. Of course, the quantity of ingredients contained within the vessel 50 can be varied, but it has been found that a preferred design incorporates approximately three ml. (4 g.) of dichlorvos and ten ml. of Freon 12 into the vessel 50, and the discharge being completed in approximately ten seconds with the filter means 75 completely absorbing and trapping the liquid dichlorvos in this time.

When the momentary push button switch 158 is pressed, current is passed to the locking relay 152 which maintains the switch 152' closed even though switch 158 is released. However, the thermal relay 150 takes approximately twenty seconds to be sufficiently heated to close the switch 150' thereby energizing the power switching relay 154 and closing the switches 154' to activate the motor 125 and the electrical resistance wires 138 surrounding the conduit means 35. In this manner, carrier gas in the form of compressed air is not fed to the cartridge 20 until sufficient time has passed to insure that the active material within the vessel 50 has been completely dispensed and absorbed by the filter means 75.

The warm cabin air from the compressor means 130 vaporizes the dichlorvos and carries the vapor through the conduit means 35 to all pressurized areas of the aircraft 15, different branches of the conduit means 35 extending, for example, to the cabin, the baggage compartments and the flight deck of the aircraft.

The required output from the compressor means 130 is designed to be proportional to the aircraft volume to be treated and variations may be obtained by a bleed air nozzle (not shown) in the compressor outlet which may be adjusted during installation to limit the air passing through the cartridge 20 to that required for disinsection of the particular aircraft.

The conduit means 35 are heated as indicated to prevent condensation of the dichlorvos on the inner surface of the tubing 135. The conduit means 35 can be provide in preselected section lengths which may be butted and joined with Teflon sleeve-bellows (not shown) to form a continuous heated tube of the desired length, with the heating elements of each tube being a complete unit and the units being electrically connected in parallel. The distribution nozzles 142 may be spaced uniformly as needed, for example, every forty inches, these nozzles preferably being of nylon plastic and being pressed into openings in the conduit means.

The dichlorvos or other active material vapor leaves the conduit means through the distribution nozzles 142 and is directed, preferably, into the main stream of air from the cabin ventilating system in a pressurized aircraft with which it mixes immediately. There is a continuous removal of the dichlorvos-air mixture from the aircraft through exhaust valves and three to four minutes after completion of the disinsection cycle the cabin air is free of insecticide.

The dichlorvos or other such insecticide is vaporized by the warm air from the compressor in an amount adequate for the maintenance of a concentration lethal to insects. A temperature indicator (not shown) which changes color when the cartridge has been discharged may be attached to the outside of the housing means 42 and the cartridge is designed as a "one shot" device which cannot be refilled thereby providing evidence of proper disinsection of a given aircraft. The digital elapsed time indicator which may show the nearest tenth of an hour that the system has been operated provides verification that disinsection has been carried out.

After a given period of time, preferably approximately thirty minutes for aircraft disinsection, the timer means 156 automatically breaks the circuit opening the locking relay 152 which in turn opens the power switching relay 154 and deactivates the motor means 125 and the heater means 138 on the conduit means 35. Since the preferred timer means 156 immediately resets itself for further use, a resistor means 162 may be included in the circuit to quickly withdraw current from the locking relay 152. In this manner the system is automatically cut off after a predetermined interval to preclude the possibility of overtreatment and to minimize the time during which the system components are operated.

The indicator light 160 is maintained on throughout the disinsection cycle.

Thus, it will be seen that activation of the disinsection system of the instant invention is relatively simple, requiring no more than about thirty seconds and, once activated, the system operates unattended and automatically for the entire disinsection operation. If desired, multiple disinsection cycles can be utilized with a plurality of individual cartridges for larger volume spaces or, alternatively, larger cartridges may be provided.

The instant system provides a carefully controlled disinsection of a given space and is not in any way dependent on natural convection which render prior art spontaneous systems uncontrollable. The advantages of the disinsection system of the instant invention and the cartridge used therewith are now believed obvious.

Accordingly, what is claimed is:

1. A cartridge comprising a housing means including an imperforate peripheral side wall, a closed base portion, and an oppositely disposed open neck portion, a pressurized vessel carried by said base portion of said housing means, a quantity of a mixture of a propellant and a vaporizable active material within said vessel, a normally closed valve means operatively associated with said vessel for dispensing said active material from said vessel under the pressure of said propellant when said valve means is opened, a nozzle means operatively associated with said valve means for spraying said dispensed active material toward said peripheral side wall of said housing means, a filter means interposed between said nozzle means and said peripheral side wall of said housing means for absorbing said active material sprayed from said nozzle means, a first chamber means defined between the outer surface of said filter means and the inner surface of said peripheral wall portion of said housing means, and a second chamber means defined by the inner surface of said filter means, said nozzle means being disposed within said second chamber means, whereby, after absorption of said active material by said filter means, a pressurized carrier gas can be fed into said cartridge to one of said chamber means, through said filter means to the other of said chamber means and out of said cartridge to thereby pick up a quantity of said active material from said filter means and deliver the same to a location remote from said cartridge under controlled conditions.

2. A disinsecting system comprising, in combination, a cartridge according to claim 1, a source of a carrier gas under pressure, means communicating said carrier gas source with one of said chamber means, conduit means including dispensing means at a location remote from said cartridge, and means communicating said conduit means with the other of said chamber means.

3. The disinsecting system of claim 2 wherein said active material is dichlorvos.

4. The disinsecting system of claim 3 for use in an aircraft, said conduit means including branches extending throughout said aircraft, and dispensing nozzles carried by said conduit means at spaced locations along each of said branches.

5. The disinsecting system of claim 2 including a manifold and support assembly, said manifold and support assembly including support means for removably receiving and holding said cartridge, inlet means communicating between said carrier gas source and said first chamber means, and outlet means communicating between said second chamber means and said conduit means.

6. The disinsecting system of claim 5 wherein said support means includes a support sleeve surrounding engaging at least a portion of said peripheral side wall of said housing means, and quick-disconnect coupling means removably engaging said neck portion of said housing means.

7. The disinsecting system of claim 5 wherein said outlet means includes an elongated hollow element having one end portion extending into said second chamber means when said cartridge is received and held by said support means, said one end portion including apertures communicating the interior of said hollow element with said second chamber means, and gasket means carried by said cartridge and sealingly engaging about the exterior of said hollow element in spaced relation to said one end portion to segregate said first and second chamber means.

8. The disinsecting means of claim 7 further including trigger means carried by said one end portion of said hollow element, said trigger means being of sufficient length to engage said nozzle means on insertion of said cartridge into said support means and to press said nozzle means against said valve means thereby opening said valve means and spraying said active material onto said filter means.

9. The disinsecting system of claim 8 wherein said carrier gas source is a compressor means, said conduit means including heater means for heating the same, said combination further including control means for activating said compressor means and said heater means, said control means including delay means for delaying activation of said compressor means and said heater means for a time sufficient to insure that all of said active material within said vessel is sprayed onto said filter means before carrier air is passed through said cartridge to said conduit means.

10. The disinsecting system of claim 9 wherein said heater means includes resistance wires surrounding said conduit means.

11. The disinsecting system of claim 9 wherein said control means further includes timer means for automatically deactivating said compressor means and said heater means after a predetermined period when substantially all of said active material has been removed from said filter means.

References Cited

UNITED STATES PATENTS

| | | | |
|---|---|---|---|
| 3,027,678 | 4/1962 | Whitney et al. | 43—125 |
| 3,330,481 | 7/1967 | Dearling | 239—47 |

FOREIGN PATENTS

| | | |
|---|---|---|
| 1,140,883 | 1/1969 | Great Britain. |
| 441,863 | 1/1968 | Switzerland. |

WARNER H. CAMP, Primary Examiner